United States Patent
Jang

(10) Patent No.: US 12,131,348 B2
(45) Date of Patent: Oct. 29, 2024

(54) SYSTEM AND METHOD REFUNDING FOREIGNERS' TAXES

(71) Applicant: LORDSYSTEM CO., LTD., Seoul (KR)

(72) Inventor: Yang Ho Jang, Yeoncheon-gun (KR)

(73) Assignee: LORDSYSTEM CO., LTD., Seoul (KR)

( * ) Notice: Subject to any disclaimer, the term of this patent is extended or adjusted under 35 U.S.C. 154(b) by 0 days.

(21) Appl. No.: 17/047,355

(22) PCT Filed: Apr. 13, 2018

(86) PCT No.: PCT/KR2018/004321
§ 371 (c)(1),
(2) Date: Oct. 13, 2020

(87) PCT Pub. No.: WO2019/198848
PCT Pub. Date: Oct. 17, 2019

(65) Prior Publication Data
US 2021/0118006 A1    Apr. 22, 2021

(51) Int. Cl.
*G06Q 30/0234* (2023.01)
*G06Q 20/04* (2012.01)
(Continued)

(52) U.S. Cl.
CPC ....... *G06Q 30/0234* (2013.01); *G06Q 20/042* (2013.01); *G06Q 20/4014* (2013.01); *G06Q 40/123* (2013.12)

(58) Field of Classification Search
CPC ............. G06Q 30/0234; G06Q 40/123; G06Q 20/042; G06Q 20/4014
See application file for complete search history.

(56) References Cited

U.S. PATENT DOCUMENTS

| 5,903,876 | A | * | 5/1999 | Hagemier | ............... | G06Q 30/06 |
| | | | | | | 705/19 |
| 2005/0096989 | A1 | * | 5/2005 | Ostlund | ................. | G06Q 20/20 |
| | | | | | | 705/19 |

(Continued)

FOREIGN PATENT DOCUMENTS

| KR | 10-2004-0089769 A | 10/2004 |
| KR | 10-2009-0064267 A | 6/2009 |

(Continued)

OTHER PUBLICATIONS

Cho, J.C., 2017. Understanding Korea's advance customs valuation arrangement and refund claim regimes. World Customs Journal, 11(1), pp. 69-72. (Year: 2017).*

(Continued)

*Primary Examiner* — Bruce I Ebersman
*Assistant Examiner* — John O Preston
(74) *Attorney, Agent, or Firm* — Maschoff Brennan

(57) ABSTRACT

The present invention relates to a system and method for refunding foreigners' taxes and, more particularly, to a system and method for instantly refunding foreigners' taxes, in which taxes are easily refunded depending on foreigners' purchasing behavior and a refund desk operating company (Tax Van company) can receive commission through a brokerage company without receiving commission through affiliated stores, thereby preventing generation of receivables.

4 Claims, 15 Drawing Sheets

(51) Int. Cl.
   *G06Q 20/40*   (2012.01)
   *G06Q 40/12*   (2023.01)

(56) References Cited

U.S. PATENT DOCUMENTS

2011/0087537  A1     4/2011   Hanafi et al.
2014/0229305  A1*    8/2014   Ellan .................... G06Q 20/047
                                                          705/17
2015/0242832  A1*    8/2015   Corritori ............ G06Q 10/0831
                                                          705/19

FOREIGN PATENT DOCUMENTS

| KR | 10-2016-0043980 A | 4/2016 |
| KR | 10-2016-0143399 A | 12/2016 |
| KR | 10-2017-0006792 A | 1/2017 |
| KR | 10-2017-0063188 A | 6/2017 |
| WO | 2015/009100 A1 | 1/2015 |

OTHER PUBLICATIONS

Tait, A.A., 1991. Value-added tax: administrative and policy issues. In Value-Added Tax. International Monetary Fund. (Year: 1991).*
Lourdunathan, F. and Xavier, P., 2017. A study on implementation of goods and services tax (GST) in India: Prospectus and challenges. International Journal of Applied Research, 3(1), pp. 626-629. (Year: 2017).*

\* cited by examiner

[FIG. 1a]
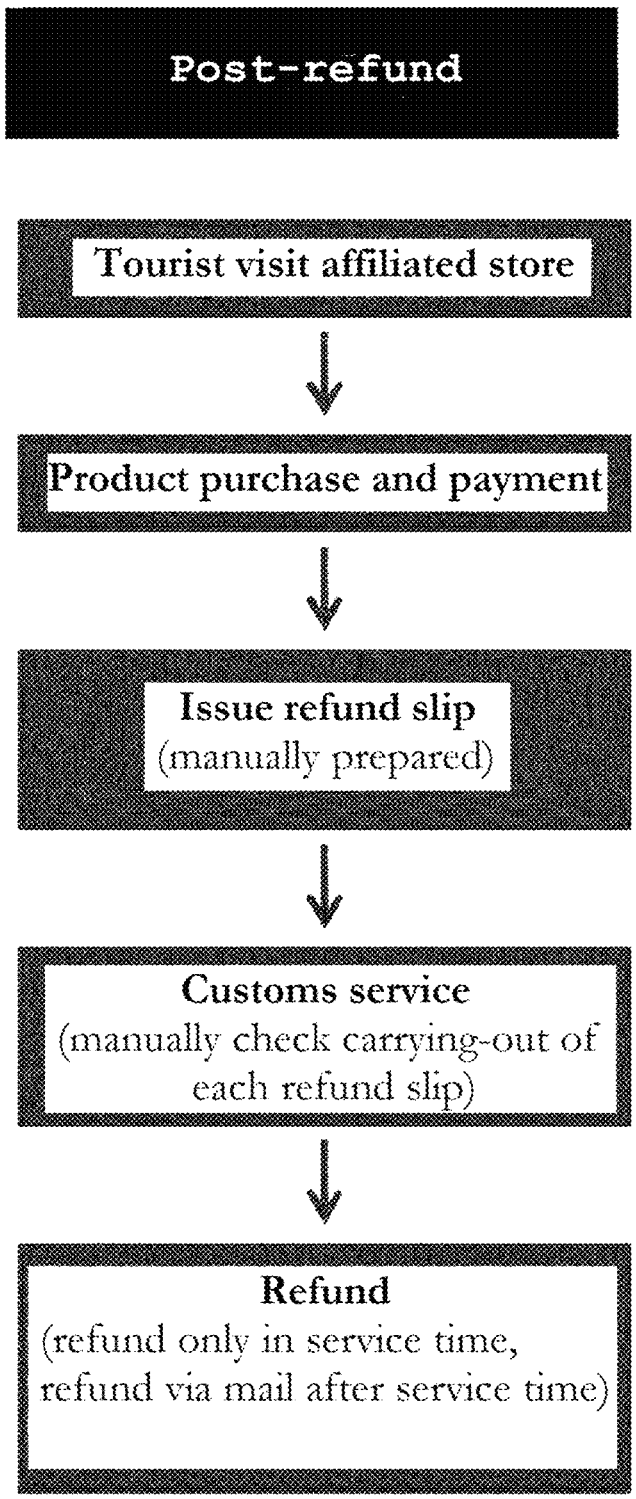

[FIG. 1b]
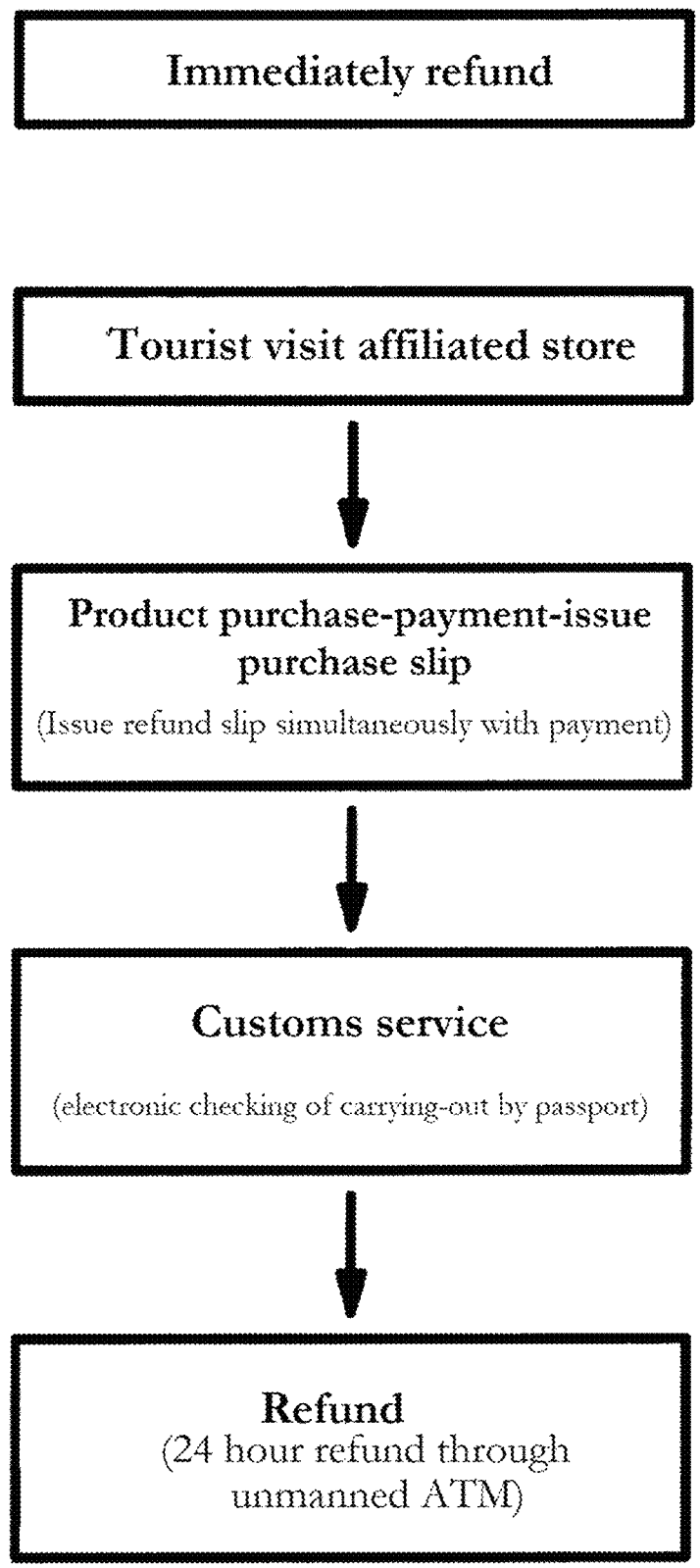

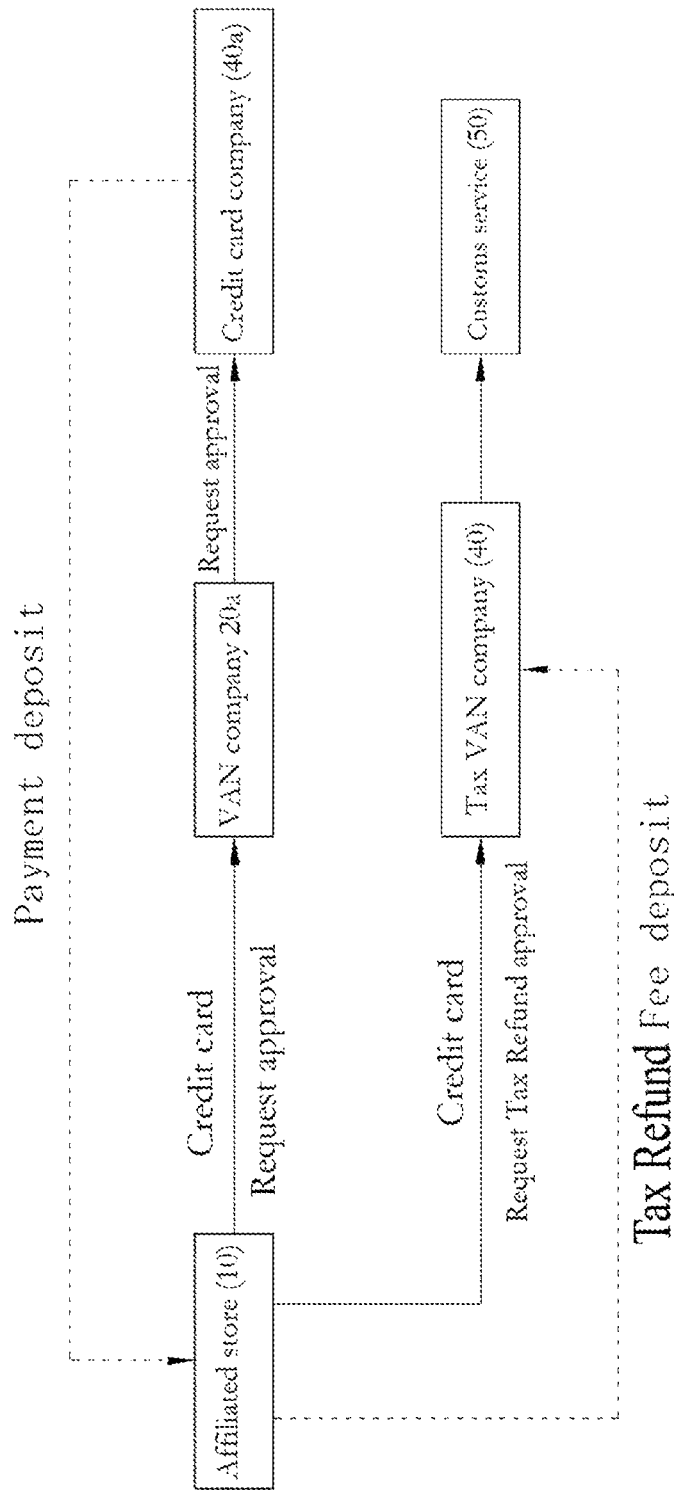
[FIG. 2]

SYSTEM AND METHOD REFUNDING FOREIGNERS' TAXES

FIELD OF INVENTION

The present invention relates to a foreign tax refund system and method, more particularly, a system and method for instantly refunding foreigner's taxes, which are configured to easily refund depending on foreigner's purchasing behavior and to receive commissions by a refund desk operator (TaxVan company) as a brokerage agency rather than affiliated stores, thereby avoiding generation of receivables.

BACKGROUND OF INVENTION

Recently, as international exchanges have become more active and overseas travel has become more common, shopping in foreign department stores, airport terminals, etc. has become more frequent.

When shopping in a foreign country, that is, when a Korean purchases a product in a foreign country, or vice versa, a foreigner comes to Korea and buys a product, a portion of tax on the product is refundable.

Specifically, depending on the "VAT and Special Excise Tax Exemption Regulation for Foreign Tourists", it is institutionalized that foreign tourists or overseas Koreans who have bought goods at about 60 sales outlets designated by the National Tax Service, for example, post-duty free businesses such as department stores, in addition to pre-duty free businesses such as duty-free stores, can receive a tax refund immediately before departure at the refund counter in the bonded area of the departure hall after completing a departure procedure.

Referring to FIG. 1(a), in order to refund tax to such a foreigner, a complicated process, in which the sales staff first checks a place of residence of the buyer (foreign tourist) and determines whether the credit card transaction is subject to tax refund, and then, after identifying what kind of taxable items the bought product for credit card transaction is applied to, the staff directly and finally calculates the tax refund amount, is required. In addition, a foreigner should possess a physical passport and the sales staff should read the passport using a passport recognition device such as a passport reader to check it.

Accordingly, this is not only annoying for sales staff, but also often causes a mistake in judging whether or not they are foreigners and, in case of a slack store, the sales staff may even forget to refund the tax.

From the point of view of the shop owner, the sales staff must be thoroughly trained in regard to a tax refund procedure and training expenses cannot be ignored.

Further, when a foreigner wishes to receive a refund, he/she shall receive and keep a refund slip for each purchase and then submit it to the refund counter upon confirmation of customs at the time of departure. In fact, all processes of receiving the refund slip every time, keeping the same and then being confirmed in the customs service are very cumbersome.

Further, a refund counter operator (Tax Refund VAN company) operating the refund counter may confirm the refund only within the refund service time and, out of the service time, has a problem that refund confirmation can only be done by mail.

If the refund slip is lost or damaged, the refund slip must be reissued which causes a problem of inconvenience. Therefore, the tax refund is often abandoned or becomes impossible.

Efforts have been made to resolve such inconveniences and, depending on Korean Patent Laid-Open No. 10-2004-89769, there is disclosed a system and a method for automatically determining whether or not the object of tax refund is related to the credit card transaction or a tax refund amount related thereto. However, the above system and method are only used to automatically calculate the tax refund amount.

Therefore, there is still a hassle that the foreign purchaser must have a refund slip and submit the same for confirmation through the refund counter.

On the other hand, as shown in FIG. 1(b), post-duty free business in Korea has introduced and implemented value added tax-exempt (pre-refund) service in accordance with "VAT Regulations on Value Added Tax and Special Consumption Tax for Foreign Tourists" dated 1 Jan. 2016, wherein payment is done with immediate deduction of the tax when purchasing goods, which is the same as a city duty-free shop as a pre-duty free business.

As a result, foreign tourists can purchase goods with exclusion of VAT at the site where the affiliated store merchandises the goods. Such immediate tax refund service is a system allowing foreign tourists to receive tax exemption benefits at stores excluding 10% VAT, if they purchase goods over 30,000 won and less than 200,000 won for each purchase within the entire limit of 1 million won per person during a length of their visit.

To do this, the foreign purchaser must have a passport for identification so that the sales staff may recognize the passport through a passport reader and take a step for pre-refund.

Meanwhile, a company usually has business for tax refund in the above-mentioned foreigner tax refund process, which is authorized to operate a refund counter and performs tax refund business through the customs service.

In the following description including the present invention, such a refund counter operator will be commonly referred to as Tax Refund VAN company and will be indicated as TaxVAN company.

On the other hand, as is well known, the affiliated store 10 provides a credit card slip to the consumer when the credit card payment is approved by a credit card company through VAN linkage offline and/or payment gateway (PG) linkage online, thereby completing the sales process. The approved sales amount is deposited in a bank where the affiliated store has a bank account through determined processes, and the affiliated store may convert the same into cash for use.

When a foreign buyer purchases a product and pays by credit card through a terminal of the affiliated store 10, as shown in FIG. 2, the affiliated store 10 requests tax refund approval through TaxVAN company 40, and then, TaxVAN company 40 proceeds with the tax refund procedure after checking with the customs service 50.

At this time, when the foreigner receives pre-refund or post-refund using the refund system, a tax refund fee due to use of the refund system may be paid by the foreigner who is a tourist, and the tax refund fee is included in the payment and deposited when the credit card company 30a deposits the Payment with the affiliated store 10.

The affiliated store 10 having collected the payment must pay TaxVAN company 40 a predetermined tax refund fee depending on the tax refund procedure, and TaxVAN company 40 charges the fee to the affiliated store monthly or by unit fee. In accordance with the charge, the affiliated store 10 pays the tax refund fee.

However, TaxVAN company 40 has no choice but to afford additional time and personnel for such a fee billing operation as described above, and the affiliated store 10 does not often deposit TaxVAN fee to cause unpaid amount (that is, accounts receivable), which in turns will lead to the loss to TaxVAN company 40.

In addition, there is a problem such that a lot of separate CMS fees may be incurred in the payment process using CMS.

Accordingly, the volume of transactions in the affiliated store 10 is extremely small, and this problem will eventually cause damage to foreigners visiting Korea.

Further, when foreigners make payments using coupons normally issued other than credit cards, no tax refund system by such coupons is present and thus the foreigners do riot receive a tax refund when using coupons.

Therefore, there is a need for an immediate refund system and method for foreigner's taxes that can solve all the above problems and, when foreigners visit Korea and purchase goods, may smoothly receive tax refunds even if paying with credit cards or coupons, may eliminate losses to affiliated stores 10 and TaxVAN company 40, and can increase mutual reliability.

SUMMARY OF INVENTION

Technical Problem to be Solved

The present invention has been proposed to overcome the above-mentioned problems, and an object of the present invention is to provide a foreigner's tax refund system and method that is configured to easily refund the tax depending on the foreigner's purchasing behavior while the refund counter operator (TaxVan company) may receive a commission through a brokerage agency rather than affiliated stores, thereby avoiding accounts receivable.

Technical Solution

In order to achieve the above object, the present invention provides a foreigner's tax refund system, including: an intelligent terminal of an affiliated store that is used for inputting transaction information including card information, product price and payment information depending on IC credit card payment by a foreign buyer during credit card payment, requesting credit card approval for payment processing, inputting passport information of the foreign buyer, and requesting tax refund approval for tax refund processing; a payment gateway (PG) network that processes payment depending on the transferred credit card approval request; a refund network that processes a tax refund depending on the transferred tax refund approval request; and a server of a brokerage agency that performs encryption of the credit card approval request from the intelligent terminal of the affiliated store into PG approval information depending on PG linkage and then requesting of the encrypted information through the PG network, and encryption of the tax refund approval request from the intelligent terminal of the affiliated store into tax refund approval information and then requesting of the encrypted information through the refund network.

The information requested by the intelligent terminal of the affiliated store is generated only through the server of the brokerage agency.

On the other hand, in the case of payment using coupons, the inventive system may include: an intelligent terminal of an affiliated store that is used for inputting transaction information including coupon information, product price and payment information depending on payment by a foreign buyer using coupons, requesting coupon approval for payment processing, inputting passport information of the foreign buyer, and requesting tax refund approval for tax refund processing; a refund network that processes tax refund depending on the transferred tax refund approval request; and a server of a brokerage agency that performs checking of the coupon information depending on the coupon approval request from the intelligent terminal of the affiliated store, depositing of a coupon amount to the affiliated store, and encryption of the tax refund approval request from the intelligent terminal of the affiliated store into tax refund approval information and then requesting of the encrypted information through the refund network.

The information requested by the intelligent terminal of the affiliated store is generated only through the server of the brokerage agency.

Effect of Invention

As described above, first, the instant foreigner's tax refund system and method depending on the present invention achieve effects of improving efficiency in the refund procedure since a process of preparing separate refund slip after the foreigner's purchase is omitted to thus enable consistent checking of carrying-out products by passport identification, thereby reducing a waiting time.

Second, if required, the affiliated store can issue a receipt including a refund slip upon purchase payment by the foreigner through the passport reader and the terminal, thereby increasing convenience. Further, since manually writing a separate 0% tax declaration paper is not required, errors in declaration may be reduced while improving work efficiency.

Third, TaxVan company can receive commissions directly through a brokerage agency rather than affiliated stores to prevent incurrence of fee receivables, thereby maximizing

BRIEF DESCRIPTION OF DRAWINGS

FIGS. 1a and 1b illustrate a tax refund depending on the foreigner's tax refund system depending on the prior art.

FIG. 2 illustrates approval processes involving an affiliated store and TaxVan company and deposition of fees in case of refunding foreigner's tax shown in FIG. 1.

BEST MODE

Figure 3:
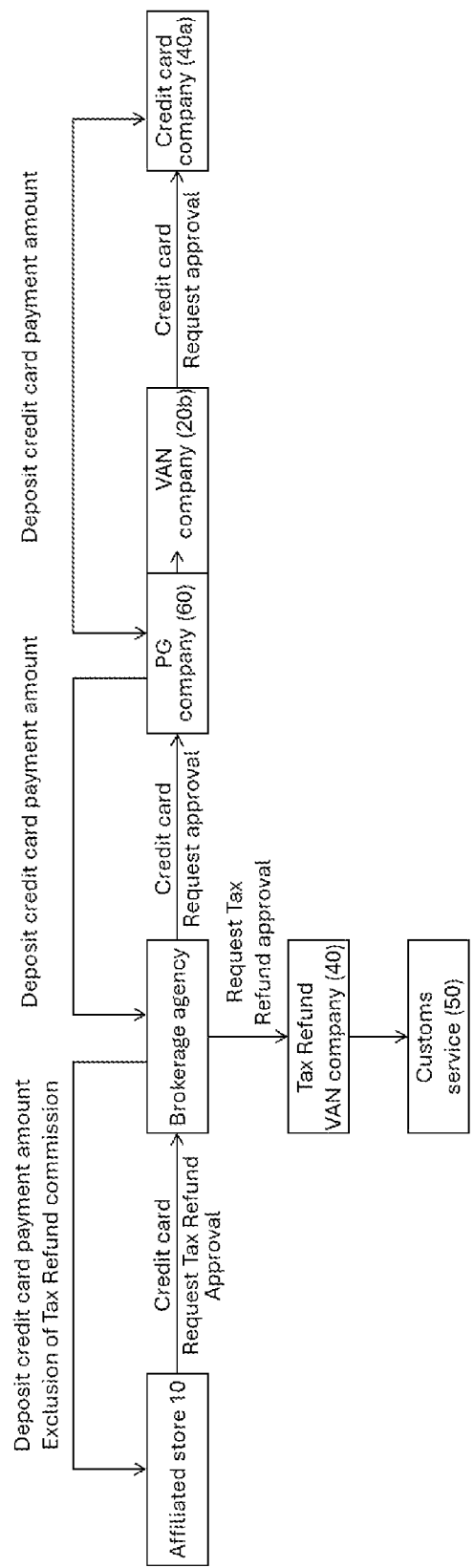
FIG. 3 and FIG. 4 illustrate a foreigner's tax refund system depending on the present invention at the time of credit card payment.
Figure 4:
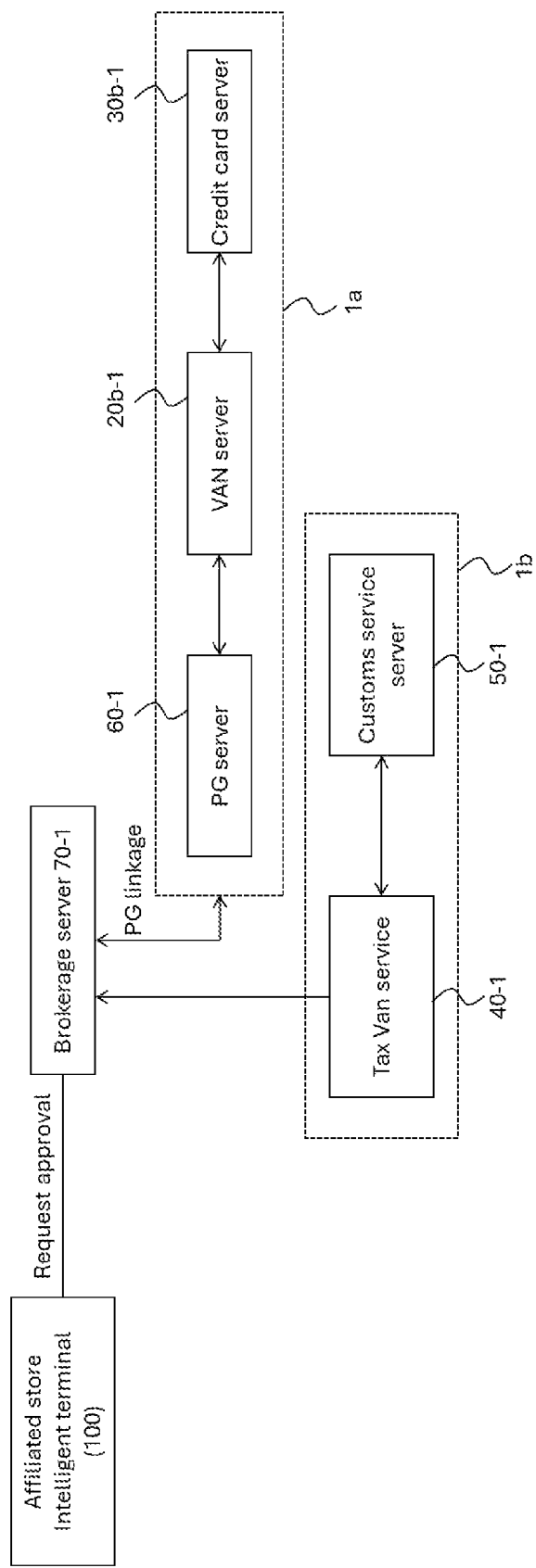
Figure 5:
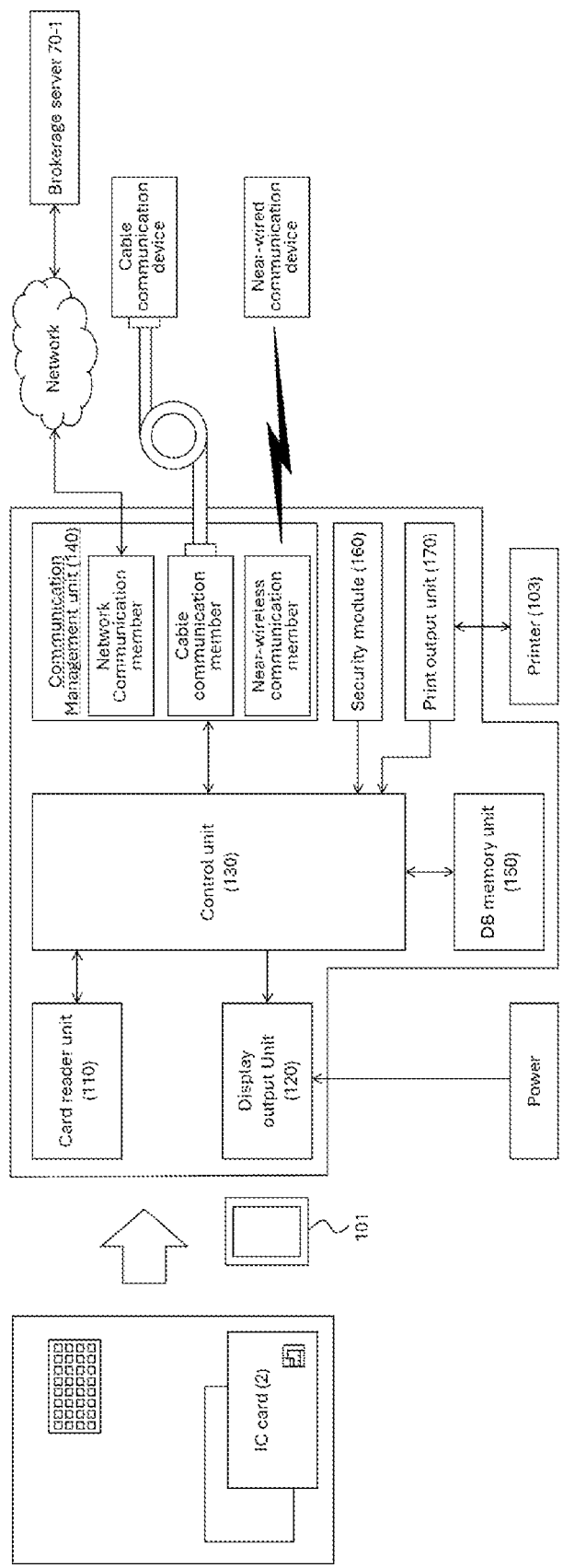
FIG. 5 illustrates an intelligent terminal of an affiliated store applied to the foreigner's tax refund system depending on the present invention.
Figure 6:
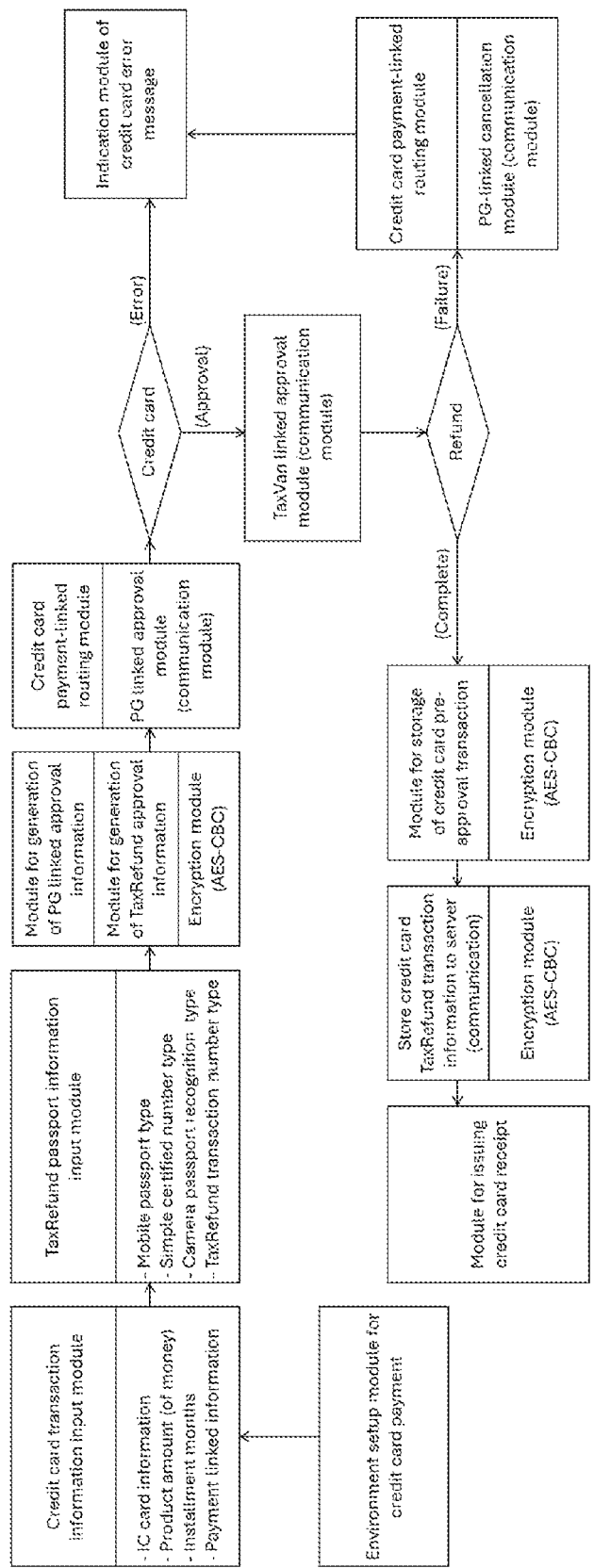
FIG. 6 is a block diagram showing the foreigner's tax refund system depending on the present invention at the time of credit card payment.
Figure 7:
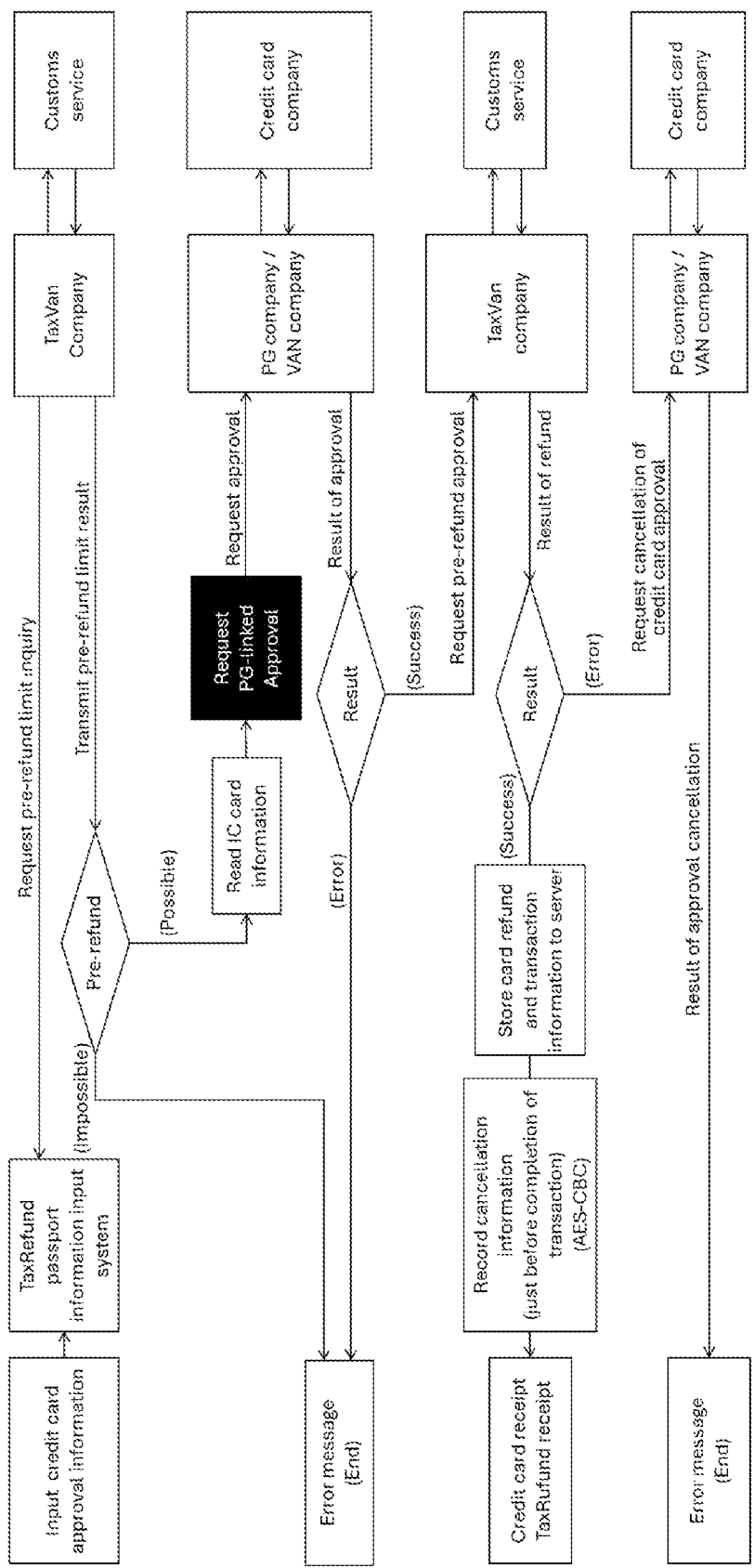
FIG. 7 and FIG. 8 are flowcharts illustrating tax refund by the foreigner's tax refund system depending on the preset invention at the time of credit card payment.
Figure 8:
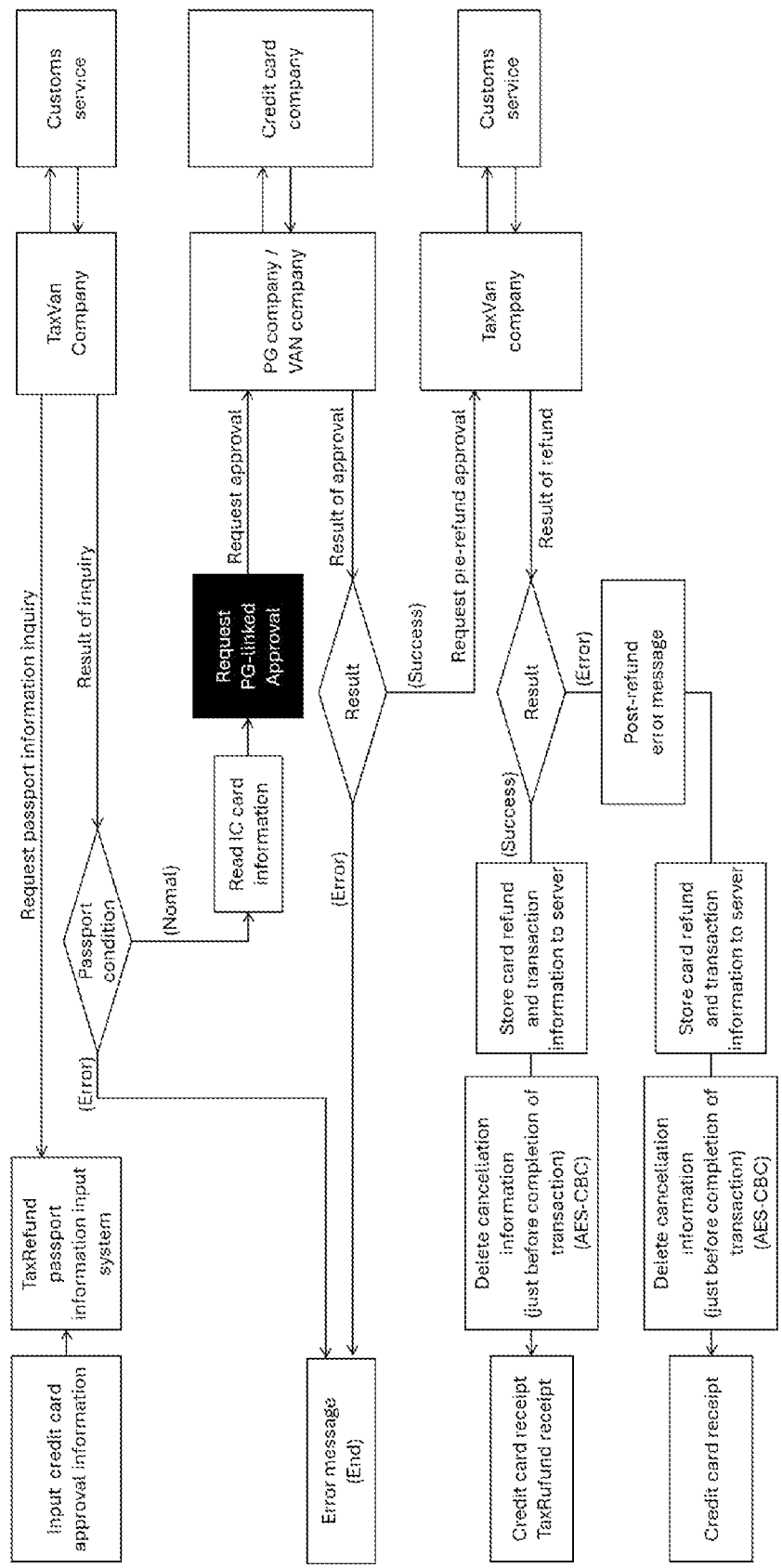
Figure 9:
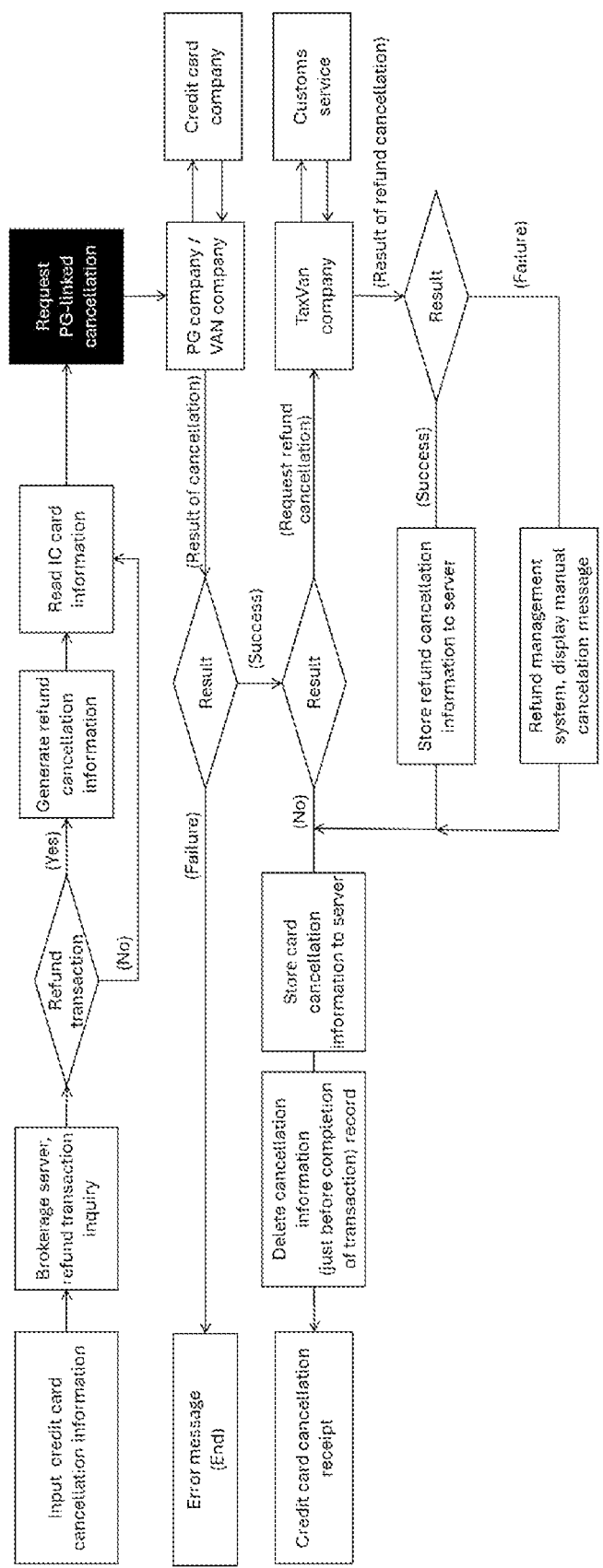
FIG. 9 is flowchart illustrating refund cancellation by the foreigner's tax refund system depending on the present invention due to payment cancellation at the time of credit card payment.
Figure 10:
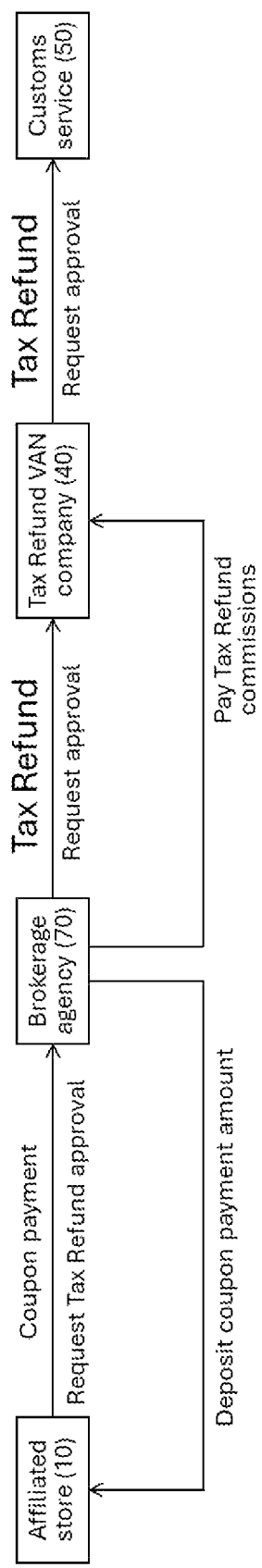
FIG. 10 illustrates a foreigner's tax refund system depending on the present invention at the time of payment using coupons.
Figure 11:
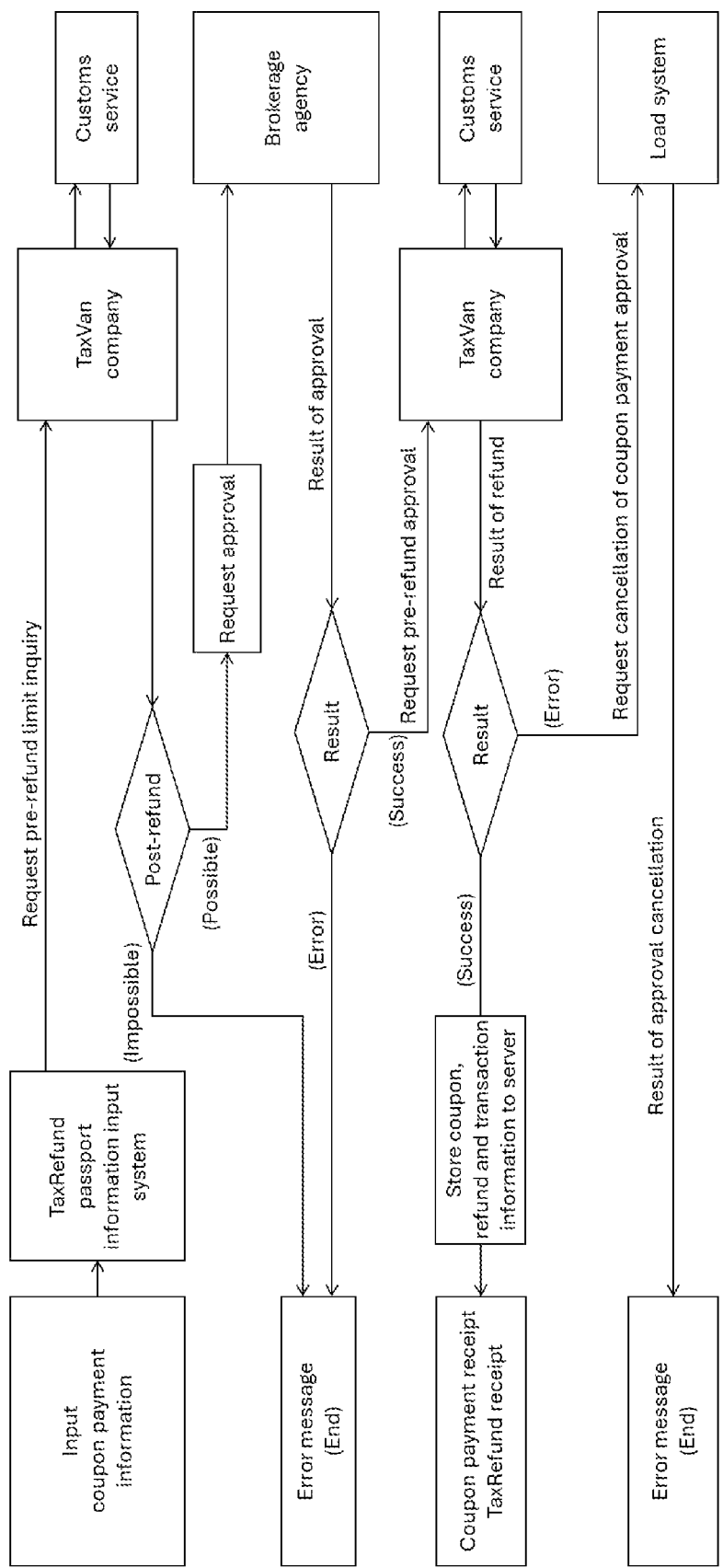
FIG. 11 to FIG. 13 are block diagrams illustrating tax refund by the foreigner's tax refund system depending on the present invention at the time of payment using coupons.
Figure 12:
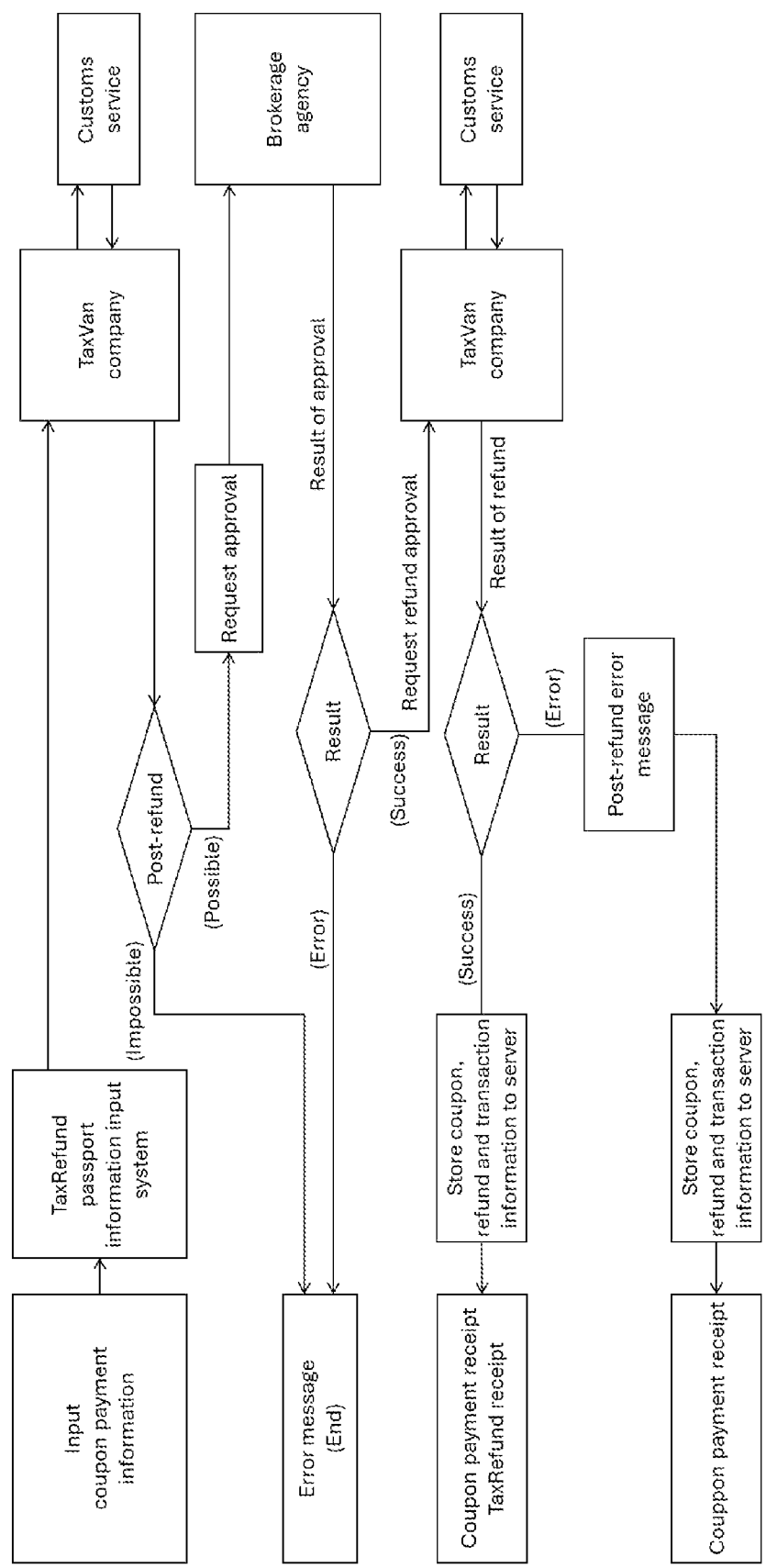
Figure 13:
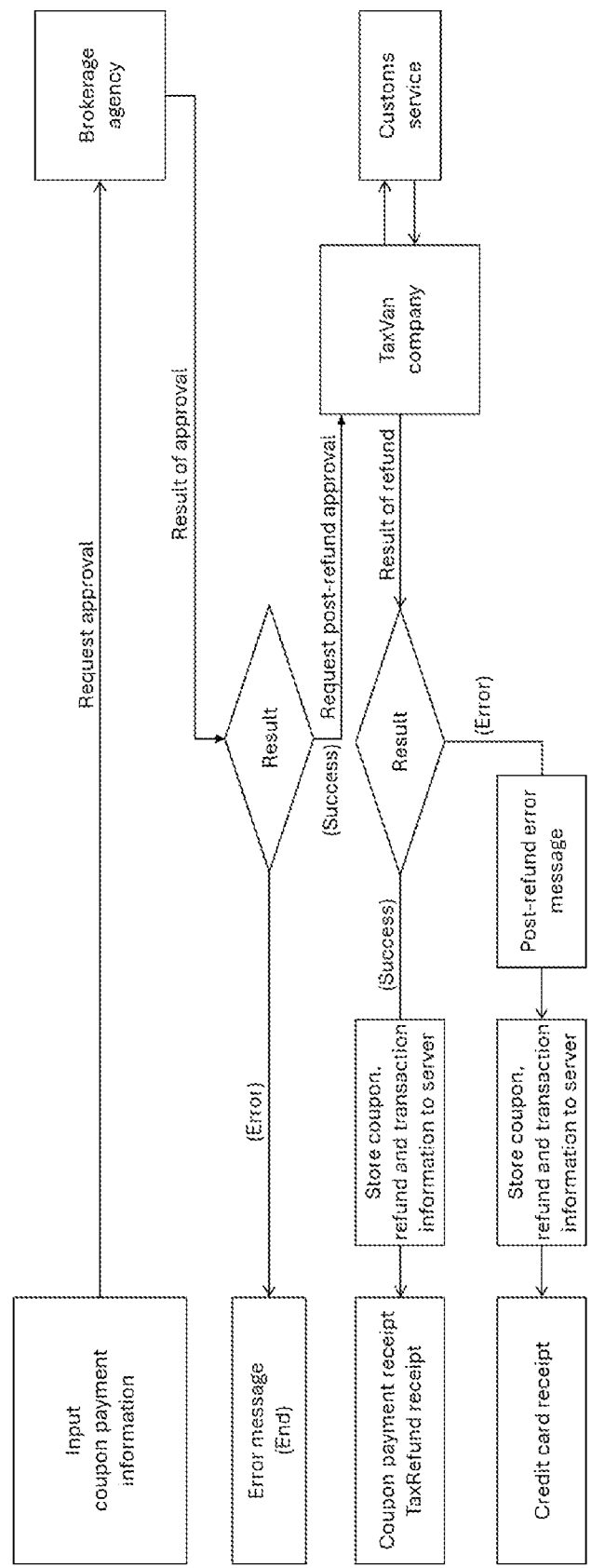
Figure 14:
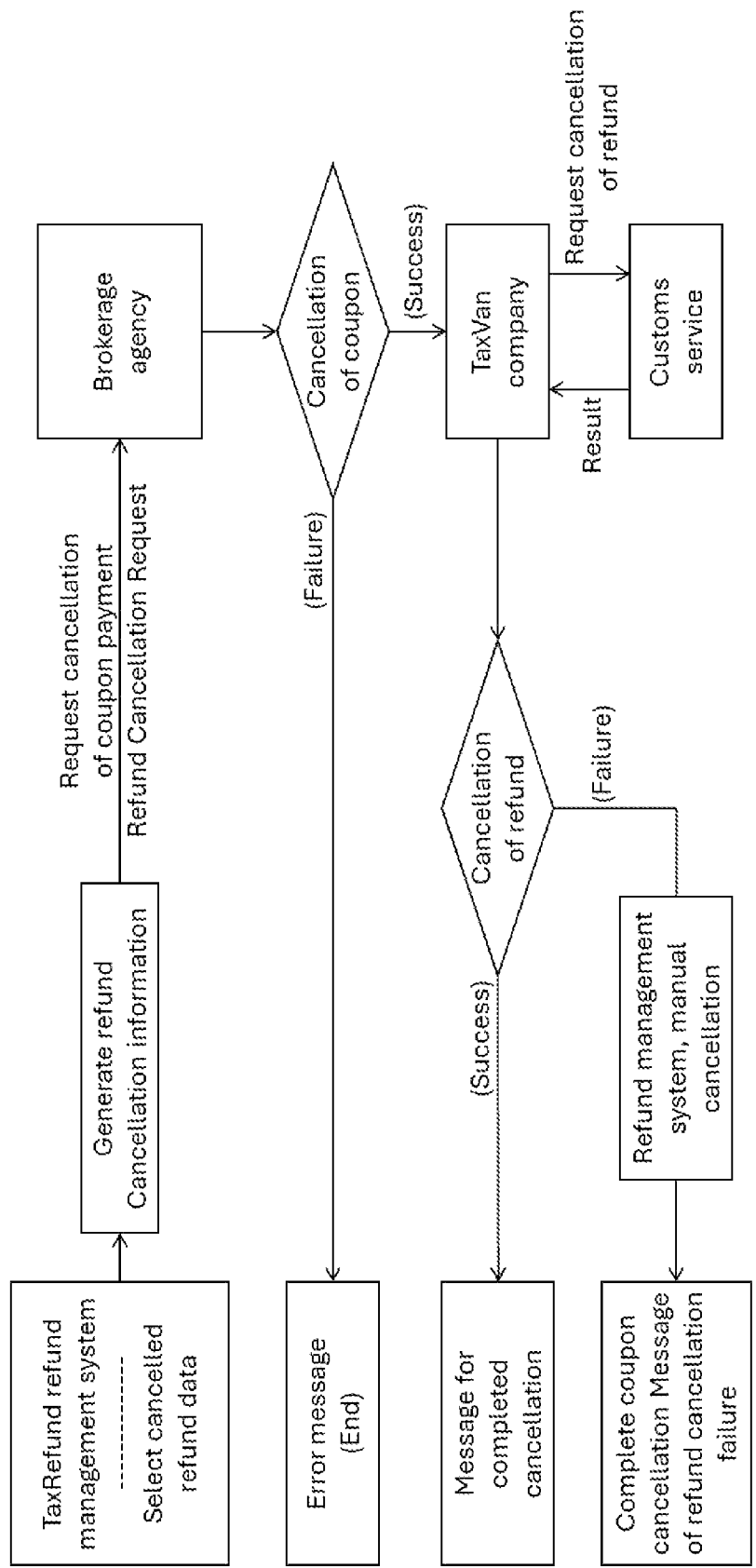
FIG. 14 is a flowchart illustrating refund cancellation by the foreigner's tax refund system depending on the present invention due to payment cancellation at the time of payment using coupons.

Depending on preferred embodiments of the present invention, there is proposed a foreigner's tax refund system, including: an intelligent terminal 100 of an affiliated store 10 that is used for inputting transaction information including card information, product price and payment information depending on IC credit card payment by a foreign buyer, requesting credit card approval for payment processing, inputting mobile passport information of the foreign buyer, which is configured by encryption and digitization of information extracted from a real passport, and requesting tax refund approval for tax refund processing;

a PG network 1a that processes payment depending on the transferred credit card approval request;

a refund network 1b that processes tax refund depending on the transferred tax refund approval request;

a server 70-1 of a brokerage agency ("brokerage server") that performs encryption of the credit card approval request from the intelligent terminal 100 of the affiliated store 10 into PG approval information depending on PG linkage and then requesting of the encrypted information through the PG network 1a, and encryption of the tax refund approval request from the intelligent terminal 100 of the affiliated store 10 into tax refund approval information and then requesting of the encrypted information through the refund network 1b; and a TaxVAN server 40-1 that receives a request for passport information inquiry or pre-refund limit inquiry and a pre-refund or post-refund approval request from the brokerage server 70-1 through the refund network 1b, and then processes the same, and accepts commissions from the brokerage server 70-1, wherein the information requested by the intelligent terminal 100 of the affiliated store 10 is generated only through the brokerage server 70-1.

DETAILED DESCRIPTION OF PREFERRED EMBODIMENTS OF INVENTION

Hereinafter, with reference to the accompanying drawings, preferred embodiments of the foreigner's tax refund system and method depending on the present invention will be described in detail.

In description of the present invention, concrete description of related known functions or configurations will be omitted in order not to obscure the subject matters of the present invention.

First, the foreigner's tax refund system and method depending on the present invention may be configured to easily refund tax depending on the foreigner's purchasing behavior, while a refund counter operator (TaxVan company) can receive commissions through a brokerage agency rather than affiliated stores, thereby preventing incurrence of receivables.

When the foreign buyer purchases a product, the product can be purchased with a credit card, a coupon or cash. The following description is given for a foreigner's tax refund method when processing credit card payment or payment using coupons.

In this case, the coupons may be coupons issued directly by the brokerage agency 70 described later or issued by a company guaranteed by the brokerage agency 70.

Referring to the drawings, a foreigner's tax refund system depending on the present invention is under discussion as follows.

In one embodiment, the credit card payment by the foreign buyer is considered as follows.

The foreigner's tax refund system may include: an intelligent terminal 100 of an affiliated store 10 that is used for inputting transaction information including card information, product price and payment information depending on IC credit card payment by a foreign buyer, requesting credit card approval for payment processing, inputting passport information of the foreign buyer, and requesting tax refund approval for tax refund processing; a PG network 1a that processes payment depending on the transferred credit card approval request; a refund network 1b that processes the tax refund depending on the transferred tax refund approval request; and a brokerage server 70-1 that performs encryption of the credit card approval request from the intelligent terminal 100 of the affiliated store 10 into PG approval information depending on PG linkage and then requesting of the encrypted information through the PG network 1a, and encryption of the tax refund approval request from the intelligent terminal 100 of the affiliated store 10 into tax refund approval information and then requesting of the encrypted information through the refund network 1b, wherein the information requested by the intelligent terminal 100 of the affiliated store 10 is generated only through the brokerage server 70-1.

On the other hand, the passport information of the foreign buyer input to the intelligent terminal 100 may be passport information in a normal real passport, which is read and stored through a passport reader or the like, or passport information in a variety of passports, which is extracted after combining the information obtained through the real passport in advance.

For example, the passport including information of the foreign buyer used in the present invention may be a mobile passport configured by extracting the information from the real passport, followed by encryption and digitization thereof. In other words, information extracted after recombining the information in the real passport is converted into an encrypted barcode, which in turns is stored in a smartphone, printed on a paper sticker, or output to a wristband in order to be used while carrying the same.

The mobile passport is stored in a separate mobile passport information server and, when the foreign buyer purchases goods followed by tax refunding, the identity of the foreign buyer can be easily confirmed.

On the other hand, the mobile passport may be represented in the form of a QR code, a simple authentication number, etc., and the registered mobile passport is linked with a coupon to thus possibly refund tax only by payment using the coupon in the same way as credit card payment.

With such a mobile passport, the passport may be quickly authenticated without the need for an authentication device such as a passport reader when checking the foreigner's passport information for tax refund. Further, the foreign tourist can separately store the real passport to avoid a risk of loss thereof.

Meanwhile, a foreigner's tax refund method using the foreigner's tax refund system as described above will be described later. Specifically, the above tax refund method may include
- a step S1 of confirming credit card approval information depending on credit card payment by a foreign buyer when purchasing a product at an affiliated store, identifying a passport of the foreign buyer and confirming the passport information;
- a step S2 of using the approval information and passport information confirmed in step S1 so that a brokerage agency requests a passport information inquiry or a pre-refund limit inquiry to TaxVAN company through a refund network;
- a step S3 of checking transaction information including product price and payment information included in the IC credit card depending on the inquiry result in step S2, so that the brokerage agency requests payment approval to PG company using PG network in order to proceed with a Payment process and, depending on the inquiry result, notifies the affiliated store of a credit card approval error;
- a step S4 of requesting a pre-refund or post-refund approval to TaxVAN company by the brokerage agency through the refund network if normal approval is granted in step S3;
- a step S5 of storing information depending on a refund progress decision in a server by the brokerage agency if a refund result from TaxVAN company is successful in response to the pre-refund request in step S4, and then, notifying the affiliated store of the result in order for the affiliated store to store information immediately before the transaction is completed and to issue a credit card receipt and a tax refund receipt to the foreign buyer;
- a step S6 of requesting cancellation of the payment approval to PG company by the brokerage agency through PG network if the refund result from TaxVAN company is an error in response to the pre-refund request in step S4, and then, notifying the affiliated store of the approval cancellation result from PG company so as to complete purchase cancellation;
- a step S7 of storing information depending on a refund progress decision in a server by the brokerage agency if the refund result from TaxVAN company is successful in response to the post-refund request in step S4, and then, notifying the affiliated store the result in order for the affiliated store to store information immediately before the transaction is completed and to issue a credit card receipt and a tax refund receipt to the foreign buyer; and
- a step S8 of storing corresponding information in a server by the brokerage agency if the refund result from TaxVAN company is an error in response to the post-refund request in step S4, and then, notifying the affiliated store of the result in order for the affiliated store to store transaction information and to issue only a credit card receipt to the foreign buyer.

In addition, in case of cancellation of the credit card payment by the foreign buyer, a step S9 of generating refund cancellation information and cancelling tax refund is further included.

In another embodiment, payment using coupons by the foreign buyer is described later.

To this end, the foreigner's tax refund system may include: an intelligent terminal 100 of an affiliated store 10 that is used for inputting transaction information including coupon information, product price and payment information depending on payment using coupons by a foreign buyer, requesting coupon approval for payment processing, inputting passport information of the foreign buyer, and requesting tax refund approval for tax refund processing; a refund network 1b that processes tax refund depending on the transferred tax refund approval request; and a brokerage server 70-1 that performs checking of the coupon information depending on the coupon approval request from the intelligent terminal 100 of the affiliated store 10, depositing of a coupon amount to the affiliated store 10, and encryption of the tax refund approval request from the intelligent terminal 100 of the affiliated store 10 into tax refund approval information and then requesting of the encrypted information through the refund network 1b.

In this regard, the information requested by the intelligent terminal 100 of the affiliated store 10 is generated only through the brokerage server 70-1.

Meanwhile, a foreigner's tax refund method using the above described foreigner's tax refund system may include the following steps:
- a step S1 of confirming coupon-payment information by an affiliated store when a foreign buyer purchases a product at the affiliated store followed by payment using a coupon guaranteed by a brokerage agency, identifying a passport of the foreign buyer and confirming the passport information;
- a step S2 of using the coupon payment information and passport information confirmed in step S1 so as to request a refund limit inquiry to TaxVAN company;
- a step S3 of requesting coupon-payment approval to the brokerage agency by the affiliated store depending on a result of the inquiry in step S2;
- a step S4 of checking the approval request in step S3 and requesting the refund approval to TaxVAN company by the brokerage agency;
- a step S5 of storing information depending on a refund progress decision in a server by the brokerage agency if a refund result from TaxVAN company is successful in response to a pre-refund request in step S4, and then, notifying the affiliated store of the result in order for the affiliated store to issue a coupon payment receipt and a tax refund receipt to the foreign buyer;
- a step S6 of notifying the affiliated store of the coupon-payment approval so as to complete purchase cancellation by the brokerage agency if the refund result from TaxVAN company is an error in response to the pre-refund request in step S4;
- a step S7 of storing information depending on a refund progress decision in a server by the brokerage agency if the refund result from TaxVAN company is successful in response to a post-refund request in step S4, and then, notifying the affiliated store of the result in order for the affiliated store to issue a coupon payment receipt and a tax refund receipt to the foreign buyer; and
- a step S8 of storing corresponding information in a server by the brokerage agency if the refund result from TaxVAN company is an error in response to the post-refund request in step S4, and then, notifying the affiliated store of the result in order for the affiliated store to store transaction information and to issue only a coupon payment receipt to the foreign buyer.

As described above, the foreigner's tax refund system and method depending on the present invention further includes a brokerage agency 70, wherein the purchase and payment processing and the tax refund processing at the affiliate store 10 may be performed only by the brokerage agency 70.

Accordingly, TaxVAN company receives commissions through the brokerage agency 70 without generation of receivables.

Therefore, all the problems caused in the prior art are overcome, in addition, when foreign buyers visit Korea and purchase goods, tax refunds may be smoothly executed even if paying with credit cards or coupons, and losses to affiliated stores 10 and TaxVAN company 40 may be eliminated while improving mutual reliability.

The present invention described above may include various substitutions and modifications within a range without departing from the technical spirit of the present invention for those skilled in the art, and therefore, is duly not limited to the aforementioned embodiments and the accompanying drawings.

The invention claimed is:

1. A system for refunding foreigner's taxes, comprising:
an intelligent terminal of an affiliated store that is configured to:
input passport information corresponding to a buyer, and payment information corresponding to a purchase;
standardize the passport information and the payment information;
encrypt, using an advanced encryption standard cipher block chaining (AES-CBC) encryption algorithm, the passport information corresponding to the buyer and the payment information corresponding to the purchase;
request, from a brokerage server, a tax refund based on the passport information and the payment information; and
request, from the brokerage server, a payment approval based on the payment information;
a payment gateway network that is configured to process the purchase based on the standardized and encrypted payment information corresponding to the affiliated store;
a refund network that is configured to process a tax refund request based on the standardized and encrypted passport information and payment information corresponding to the intelligent terminal of the affiliated store;
a brokerage server configured to:
encrypt the requested payment approval from the intelligent terminal of the affiliated store into payment gateway approval information based on a payment gateway linkage;
request the payment gateway approval information through the payment gateway network;
encrypt the tax refund request from the intelligent terminal of the affiliated store into tax refund information; and
request the tax refund information through the refund network;
a TaxVAN server that is configured to:
process one or more of a request for passport information inquiry, pre-refund limit inquiry, a pre-refund approval request, or a post-refund approval request from the brokerage server through the refund network, wherein when a refund from the TaxVAN server to the brokerage server is completed through a network system in response to the pre-refund approval request or post-refund approval request, the brokerage server is configured to store information depending on a refund progress decision in the brokerage server, the refund being deposited from a first bank account corresponding to the TaxVAN server to a second bank account corresponding to the brokerage server; and
accept commissions directly from a brokerage agency corresponding to the brokerage server as opposed to the affiliated store, the commissions being deposited from the second bank account corresponding to the brokerage server to the first bank account corresponding to the Tax VAN server through predetermined processes,
notify the affiliated store of a completed refund; and
in response to the notification of the completed refund, the affiliated store is further configured to:
store information in real time before the purchase is completed; and
issue, in real time, a payment receipt, a tax refund, and a corresponding tax refund receipt to the buyer.

2. A system for refunding foreigner's taxes, comprising:
an intelligent terminal of an affiliated store that is configured to:
input transaction information corresponding to a transaction, the transaction information including coupon information, product price, and payment information depending on payment by a buyer using a coupon, the coupon being issued or guaranteed by a brokerage server;
request, through the brokerage server, a coupon approval for payment processing based on the transaction information;
standardize and encrypt passport information corresponding to the buyer; and
request, through the brokerage server, a tax refund using the standardized and encrypted passport information corresponding to the buyer;
a refund network that is configured to process the tax refund;
a brokerage server that is configured to:
verify the coupon information depending on the requested coupon approval from the intelligent terminal of the affiliated store;
deposit a coupon amount to the affiliated store,
encrypt the requested tax refund from the intelligent terminal of the affiliated store into tax refund approval information;
request the tax refund approval information through the refund network;
store information based on a refund progress decision in the brokerage server; and
notify the affiliated store in order for the affiliated store to store information immediately before the transaction is completed such that the affiliated store issues, in real time, a coupon payment receipt and a tax refund receipt to the buyer;
a TaxVAN server that is configured to:
receive a request for a passport information inquiry, a pre-refund limit inquiry, a pre-refund approval request, or a post-refund approval request from the brokerage server through the refund network;
issue a refund in real time based on the request via a network system; and
accept commissions only from a brokerage agency via the brokerage server rather than the affiliated store to prevent incurrence of fee receivables, the commissions being deposited from a first bank account corresponding to the brokerage server to a second bank account corresponding to the TaxVAN server through predetermined processes.

3. A method for refunding foreigner's taxes using a foreigner's tax refund system, comprising:

standardizing, using an intelligent terminal of an affiliated store, passport information corresponding to a buyer and payment information corresponding to a purchase;

encrypting the standardized passport information corresponding to the buyer; and confirming, using the intelligent terminal of the affiliated store, payment information corresponding to a purchase;

requesting, using a brokerage server via a refund network, a passport information inquiry or a pre-refund limit inquiry based on the payment information and passport information;

confirming, using the brokerage server, payment information based on a result corresponding to the passport information inquiry or the pre-refund limit inquiry;

requesting, using the brokerage server, payment approval from a payment gateway company using a payment gateway network in order to proceed with a payment process; and depending on a payment approval request result, notifying the affiliated store of an error;

requesting, using the brokerage server, a pre-refund approval or a post-refund approval from a TaxVAN company through the refund network based on the result corresponding to the requested payment approval;

storing information corresponding to the requested pre-refund approval, and notifying the affiliated store of the result in order for the affiliated store to store information immediately before the purchase is completed and to issuing a payment receipt and a tax refund receipt in real time to the buyer;

in response to the affiliated store receiving the error, requesting, from a brokerage agency via the brokerage server, cancellation of the payment approval to payment gateway company by the brokerage agency through payment gateway network; and notifying the affiliated store of the cancellation of the payment approval from payment gateway company via the brokerage server to complete a purchase cancellation;

storing, by the brokerage agency, information depending on a refund progress decision in a server by the brokerage agency in response to a successful refund from TaxVAN company; and notifying the affiliated store of the refund progress decision in order for the affiliated store to store information immediately before the purchase is completed and to issue a credit card receipt and a tax refund receipt to the buyer;

storing, by the brokerage agency, corresponding information in a server by the brokerage agency in response to an unsuccessful refund from TaxVAN company; and notifying the affiliated store of the refund progress decision in order for the affiliated store to store transaction information and to issue only a payment receipt to the buyer;

generating refund cancellation information and cancelling tax refund when the purchase is cancelled; and affording commissions to TaxVAN company through the brokerage agency, the commissions being deposited from a first bank account corresponding to the brokerage agency to a second bank account corresponding to the TaxVAN company through predetermined processes, wherein the information requested by the intelligent terminal of the affiliated store is generated only through the brokerage server, and purchase and payment processing and tax refund processing at the affiliate store are performed only by the brokerage server and thus Tax Van server receives the commissions directly through the brokerage server rather than the affiliated store to prevent incurrence of fee receivables.

4. A method for refunding foreigner's taxes using a foreigner's tax refund system, comprising:

confirming, by an intelligent terminal of an affiliated store, coupon-payment information by an affiliated store when a foreign buyer purchases a product at the affiliated store followed by payment using a coupon issued or guaranteed by a brokerage agency (brokage server);

identifying passport information corresponding to a buyer, encrypting the passport information corresponding to the buyer; and confirming the passport information;

requesting, using a brokerage server, the coupon-payment information and passport information to request a refund limit inquiry to a TaxVAN company;

requesting, using the intelligent terminal of the affiliated store, coupon-payment approval to the brokerage agency based on the refund limit inquiry;

confirming, by the brokerage agency, the coupon-payment approval and requesting a refund approval from the TaxVAN company using the brokerage agency;

storing information corresponding to the requested refund approval; and notifying the affiliated store of the requested refund approval in order for the affiliated store to issue a coupon payment receipt and a tax refund receipt to the buyer;

notifying, using the brokerage agency, the affiliated store of the coupon-payment approval so as to complete purchase cancellation by the brokerage agency based on the requested refund approval from the Tax VAN company;

storing, by the brokerage agency, information depending on a refund progress decision in a server by the brokerage agency in response to a successful refund approval from TaxVAN company; and notifying the affiliated store of the refund progress decision in order for the affiliated store to issue a coupon payment receipt and a tax refund receipt to the buyer;

storing, by the brokerage agency, corresponding information in a server by the brokerage agency in response to an unsuccessful refund from TaxVAN company;

notifying the affiliated store of the refund progress decision in order for the affiliated store to store transaction information and to issue only a coupon payment receipt to the buyer; and affording commissions to TaxVAN company through the brokerage agency, wherein the information requested by the intelligent terminal of the affiliated store is generated only through the brokerage server, and purchase and payment processing and tax refund processing at the affiliate store are performed only by the brokerage server and thus Tax Van server receives the commissions directly through the brokerage server rather than the affiliated store to prevent incurrence of fee receivables, the commissions being deposited from a first bank account corresponding to the brokerage server to a second bank account corresponding to the Tax VAN server through predetermined processes.

\* \* \* \* \*